(12) United States Patent
Tocher

(10) Patent No.: US 10,470,353 B2
(45) Date of Patent: Nov. 12, 2019

(54) ROCK COLLECTION AND ROCK ROWING DEVICE

(71) Applicant: Angus Tocher, Calgary (CA)

(72) Inventor: Angus Tocher, Calgary (CA)

( * ) Notice: Subject to any disclaimer, the term of this patent is extended or adjusted under 35 U.S.C. 154(b) by 210 days.

(21) Appl. No.: 15/097,915

(22) Filed: Apr. 13, 2016

(65) Prior Publication Data

US 2017/0295713 A1    Oct. 19, 2017

(51) Int. Cl.
*A01B 43/00*      (2006.01)
*A01B 73/00*      (2006.01)

(52) U.S. Cl.
CPC ............ *A01B 43/00* (2013.01); *A01B 73/005* (2013.01)

(58) Field of Classification Search
CPC ....... A01B 43/00; A01B 73/005; E01H 12/00; E01H 15/00
See application file for complete search history.

(56) References Cited

U.S. PATENT DOCUMENTS

| | | | | | |
|---|---|---|---|---|---|
| 19,009 | A | * | 12/1857 | Anderson | A01B 43/00 171/98 |
| 64,996 | A | * | 5/1867 | Minnis | A01D 17/10 171/104 |
| 68,309 | A | * | 8/1867 | Noyes | A01D 27/02 171/105 |
| 965,115 | A | * | 7/1910 | Moore | A01B 43/00 171/140 |
| 987,202 | A | * | 3/1911 | Wichertjes | A01D 25/02 171/10 |
| 1,286,906 | A | * | 12/1918 | Bailey | A01B 33/021 171/105 |
| 1,354,321 | A | * | 9/1920 | McQueen | A01B 43/00 171/101 |

(Continued)

OTHER PUBLICATIONS

Downloaded from www.farmtender.com; Degelman Signature 6000 Rock Picker; p. 1-6; downloaded on Mar. 7, 2016.

(Continued)

*Primary Examiner* — Jamie L McGowan
(74) *Attorney, Agent, or Firm* — Anthony R. Lambert

(57) ABSTRACT

A machine and method for collecting rocks in fields and then for dumping these rocks in a row for easier pickup or for storage. The machine includes one or more rock collectors for receiving rocks along with soil, smaller rocks and field debris that may accompany the rocks, and for screening out soil, field debris and smaller rocks that are small enough to pass through gaps between the grates of the rock collectors. The machine also includes rock lifter plates that assist the lifting of rocks from the field up onto the rock collectors for screening and collection. A further embodiment of the machine includes a rock collector unloader mechanism for raising the rock collectors thereby unloading the collected rocks roughly in rows. These rows may be formed off the field, or picked up more easily by hand or with a conventional row-collecting rock picker, and then removed from the field. The rock collector unloader mechanism may be attached to a trailer frame portion of the machine, the trailer frame serving to pull the rock collectors when the trailer frame is attached to a tractor or suitable pulling machine.

12 Claims, 2 Drawing Sheets

(56) References Cited

U.S. PATENT DOCUMENTS

| | | | | |
|---|---|---|---|---|
| 1,535,321 A * | 4/1925 | Larsen | ................... | A01B 43/00 171/135 |
| 1,542,670 A * | 6/1925 | Cote | ...................... | A01B 43/00 171/101 |
| 1,593,952 A * | 7/1926 | Ribbans | ................. | A01B 43/00 171/121 |
| 1,848,394 A * | 3/1932 | Steere | ................... | A01D 29/00 171/61 |
| 2,042,193 A * | 5/1936 | Schema | ................. | A01B 43/00 171/101 |
| 2,523,263 A * | 9/1950 | Anderson | ............. | A01B 43/00 171/101 |
| 2,618,917 A * | 11/1952 | Howser | ................. | E02F 3/3486 171/144 |
| 2,652,673 A * | 9/1953 | Zehren | ................... | A01B 43/00 171/116 |
| 2,686,394 A * | 8/1954 | Kalaus | ................... | A01B 43/00 171/101 |
| 2,781,623 A * | 2/1957 | Anderson | .............. | A01B 43/00 171/141 |
| 2,793,482 A * | 5/1957 | Jurgens | ................. | A01B 43/00 171/135 |
| 3,312,287 A * | 4/1967 | Wagner | .................. | A01B 43/00 171/63 |
| 4,040,489 A * | 8/1977 | Hulicsko | ................ | A01B 43/00 171/63 |
| 4,059,158 A | 11/1977 | Ranger | | |
| 4,265,318 A * | 5/1981 | Gaspard | ............... | A01G 23/093 171/63 |
| 4,269,273 A * | 5/1981 | Colville | ................ | E02F 3/7672 172/244 |
| 4,296,818 A * | 10/1981 | Malinowski | ........... | A01B 43/00 171/144 |
| 4,319,641 A | 3/1982 | Degelman | | |
| 4,548,275 A * | 10/1985 | Squier | .................... | A01B 43/00 171/126 |
| 4,550,465 A * | 11/1985 | Chrisley | ................ | E01H 1/106 15/3 |
| 4,609,049 A * | 9/1986 | Migdal | .................. | A01B 43/00 171/107 |
| 4,698,150 A * | 10/1987 | Wigoda | .................. | B07B 1/005 171/105 |
| 5,305,834 A * | 4/1994 | White | .................... | A01B 43/00 171/144 |
| 5,630,476 A | 5/1997 | Foster et al. | | |
| 5,682,953 A * | 11/1997 | Buysse | .................. | A01B 43/00 171/105 |
| 6,092,607 A | 7/2000 | Bercheny et al. | | |
| 6,253,858 B1 * | 7/2001 | Warke | .................... | A01B 45/02 172/22 |
| 6,702,034 B2 * | 3/2004 | Clary | .................... | A01B 43/00 171/144 |
| 7,117,951 B2 * | 10/2006 | Stevens | .................. | A01B 35/14 171/105 |
| 7,841,422 B1 * | 11/2010 | Chavez | .................. | A01B 43/00 171/111 |
| 8,662,193 B2 | 3/2014 | Hill | | |
| 9,686,897 B2 * | 6/2017 | Roessler | ................ | A01B 43/00 |

OTHER PUBLICATIONS

Downloaded from www.duragrade.com; Duragrade Rock Bucket for All Late Model Skid Loaders; p. 1; downloaded on Mar. 7, 2016.

Downloaded from www.duragrade.com; Duragrade Hydraulic Rock Picker for ATVs and Utility Tractors; p. 1; downloaded on Mar. 7, 2016.

\* cited by examiner

ROCK COLLECTION AND ROCK ROWING DEVICE

TECHNICAL FIELD

Rock collection and rock rowing devices.

BACKGROUND

Clearing of rocks in agricultural fields has been an activity going back to antiquity. Early methods involved picks, shovels, horse drawn 'stone boats' and always a good deal of manual labour. More modern farming waged war on rocks with such devices as the rock rake, the rock windrower and the rock picker, all used to lessen the manual labour and time components of rock removal. Interestingly, and almost in surrender, perhaps the most practiced approach to the problem of field rocks, is not to remove them at all! This is accomplished, or not accomplished, using a long heavy steel water filled roller, much like a giant rolling pin, but pulled behind a tractor and, when the field is damp, knocking the rocks just below the surface of the soil, out of sight, at least for a time. Of course, invariably, the rocks do return to pose a hazard to agricultural equipment through field tillage, or by natural processes such as frost heaving. Eventually, through repeated rolling, some fields may begin to resemble hard-packed cobblestone parking lots as more and more rocks are thrust up from deeper in the soil.

For rock removal, various devices are available, mainly the rock windrower used in combination with the rock picker. The rock windrower consists of a horizontal rotating drum set at an angle of perhaps 30 to 40 degrees to the direction of travel as it is towed behind a tractor. The rotating drum has a series of hardened steel teeth that bunt loose rocks forward and to the side eventually kicking them out along side of the machine to form a row of rocks. This is a vigorous and slow moving process though with the teeth battering the rocks innumerable times as they progress down the rotating drum and are finally launched out the side of the windrower. Depending on the soil type, the rocks may roll for some distance and may form scattered wide rows that may later be difficult to pick up by the partnering machine, the rock picker. The rock windrower may be used in a tilled or summer fallowed field free of large amounts of stems or plant debris. It is however not usable in hayfields or other fields that may contain any significant amount of field debris as these tend to wrap around the rotating drum clogging the teeth and rendering the machine ineffective.

There is also the landscape rake—much like a heavy duty garden rake—that is used more effectively on roots and branches than on rocks. As well, there is the rotary or stick rake. There are really two types of these, one that is fairly light duty and similar to a rotary hay rake intended to be used mainly for windrowing fallen branches, and a much heavier duty version that is mainly intended to unearth and windrow tree roots but is also somewhat effective on rocks. This machine is massive though, more resembling earth moving or mining equipment than agricultural and no doubt costly. These machines are also very aggressive and till up the soil and therefore are not useful for removing rocks in hayfields without damaging the perennial forage of the hayfield. Like the rock windrower, these machines must also be operated at slow speeds perhaps in the realm of 3 to 4 mph.

There are also various designs of front-end-loader buckets that have grates or tines for skimming the surface and screening out debris and smaller rocks and then used for dumping the remaining rocks into an awaiting dump truck. These are of course limited to the width of the front-end-loader of the tractor and are mainly used for smaller areas and roadways and certainly not for acres of farm fields.

The rock picker is the machine to use for picking up rows of rocks. Having a pick-up width of typically only about 4 to 5 feet, it is effectively used with some form of rock windrowing machine, and not on its own for clearing rocks in a field. Powered and towed by a tractor, the rock picker picks up rocks that have been rowed, screens out smaller rocks, soil and smaller debris collecting the remaining rocks in a bin or hopper that is part of the rock picker machine. Once the bin is full of rocks, the rock picker may be towed off the field where the bin is tilted and the rocks are dumped out of the back end of the machine. The rock picker is considered to be a cooperating and not a competing device to the rock windrower including the device of the present invention, in the process of clearing rocks from fields.

SUMMARY

In an embodiment, there is disclosed a rock collecting machine, comprising a frame mounted on a trailer, the frame having a front and a rear defined in relation to a rock collecting orientation, a rock lifter suspended from the rear of the frame to allow a rock lifting movement (for example with a vertical and rearward component) of the rock lifter when the trailer is moving over a surface and a rock collector secured to the frame by a towing mechanism, the rock collector having a nose and the towing mechanism having a length selected such that, in operation, the nose of the rock collector is spaced rearward from the rock lifter.

In a further embodiment, there is disclosed a method for collecting rocks, comprising: suspending a rock lifter from a frame for movement in a vertical direction; towing the frame across a ground surface with a rock collector behind the rock lifter; and collecting rocks on the rock collector that are propelled onto the rock collector by the rock lifter.

In various embodiments, there may be included any one or more of the following features: the frame is hinged to the trailer to rotate forward to a travelling position and lift the rock lifter and rock collector upward onto the trailer; a winch mounted on a forward part of the trailer and connected by a winch cable to the frame for rotating the frame; the frame is triangular in shape with a forward vertex, an upper vertex and a rearward vertex, the frame is hinged to the trailer at the forward vertex and the rearward vertex is at the rear of the frame; the winch cable extends over the upper vertex and connects to the frame at the rearward vertex; a push-off spring connected to the frame or trailer to bias the frame away from the trailer when the frame is in the travelling position; the rock lifter comprises one or more plates; the one or more plates extend across the width of the rock collectors; the rock lifter is suspended from the rear of the frame by chain links; ground engaging wheels and at least two pairs of wheel mounts, one set of wheel mounts being at the rear of the trailer defined in relation to a rock collecting orientation, and one set of wheel mounts being on one side of the trailer defined in relation to a rock collecting orientation, the ground engaging wheels being connected to one of the at least two pairs of wheel mounts.

These and other aspects of the device and method are set out in the claims.

BRIEF DESCRIPTION OF THE FIGURES

Embodiments will now be described with reference to the figures, in which like reference characters denote like elements, by way of example, and in which.

DETAILED DESCRIPTION

Immaterial modifications may be made to the embodiments described here without departing from what is covered by the claims. In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

Figure 1:
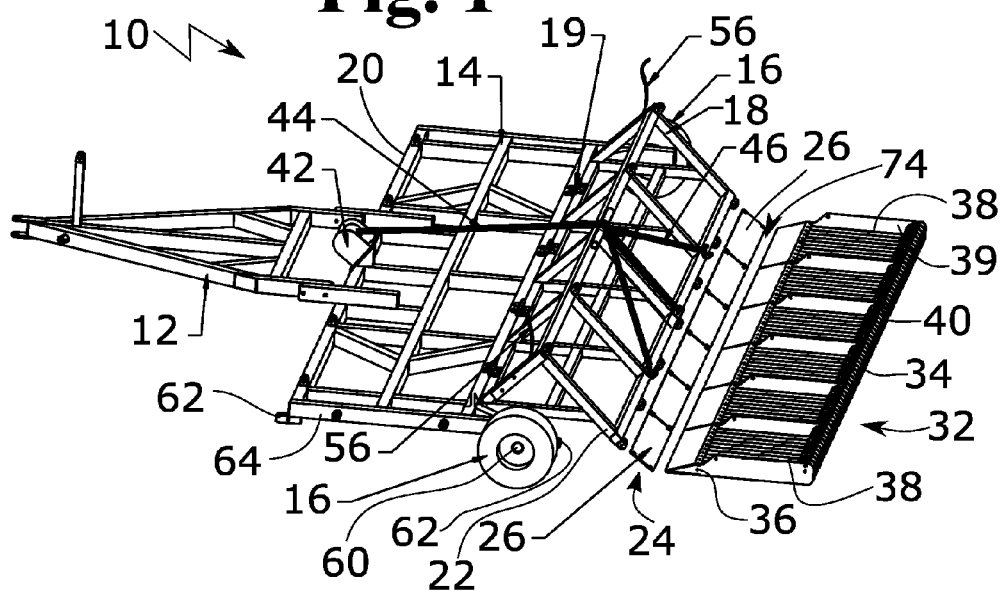
FIG. 1 is a perspective view of a rock collection machine in rock collection position.

Referring to FIG. 1, there is shown a rock collecting machine 10 in a rock collection configuration. The rock collection machine 10 may be towed by a vehicle (not shown, for example a tractor) using a field use hitch 12 that is hinged to a trailer 14 that is supported by ground engaging wheels 16 shown in field use position. The rock collection machine 10 in this embodiment includes a frame 18 mounted on the trailer 14. The frame 18 has a front 20 and a rear 22 where the terms front and rear are defined in relation to a rock collecting orientation or direction A. A rock lifter 24, formed for example of rock lifter plates 26, is suspended from the rear 22 of the frame 18 to allow vertical movement of the rock lifter 24 when the trailer 14 is moving over a ground surface. The rock lifter 24 may be suspended by any of various suitable suspension devices such as chain links 28 shown in FIG. 2, arms, rods, cables and straps. The suspension devices may be secured to pins 29 that pass through openings of gussets on plates 30 on the rear 22 of frame 18.

Figure 2:
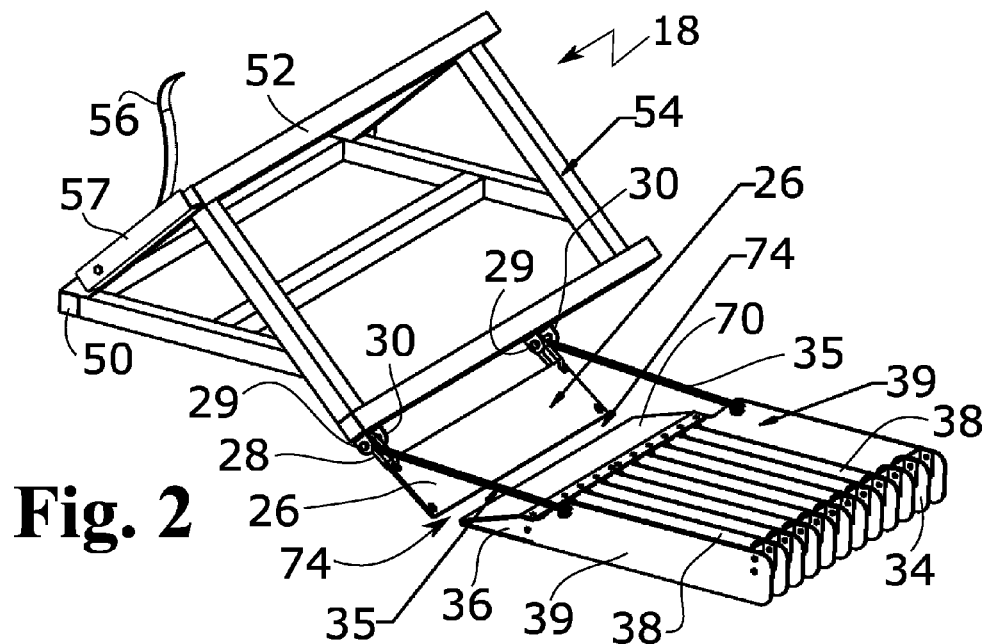
FIG. 2 shows a detail of a frame, rock lifter and collector for use in the rock collection machine of FIG. 1.

A rock collector 32 formed for example of multiple rock collector units 34 is secured to the frame 18 (in this example) by a towing mechanism 35 shown for example in FIG. 2. The rock collector units 34 may be individually secured to the frame 18 by respective towing mechanisms 35 for each rock collection unit 34 so that the rock collector units 34 form an array of individual elements that may move separately. Each towing mechanism 35 may be formed of any suitable means such as cables, links, arms, rods and straps and connects for example to the frame 18 by pins 29. The rock collector 32 (and each rock collection unit 34) has a nose 36, and vertical plates 38 forming a bed or grate for receiving rocks, each unit 34 having its vertical plates 38 bounded by slightly higher outside plates 39 that help contain rocks on the rock collector 32. The vertical plates 38 terminate rearwardly in upsets or barriers 40 that also help to retain rocks on the rock collector 32.

Figure 3:
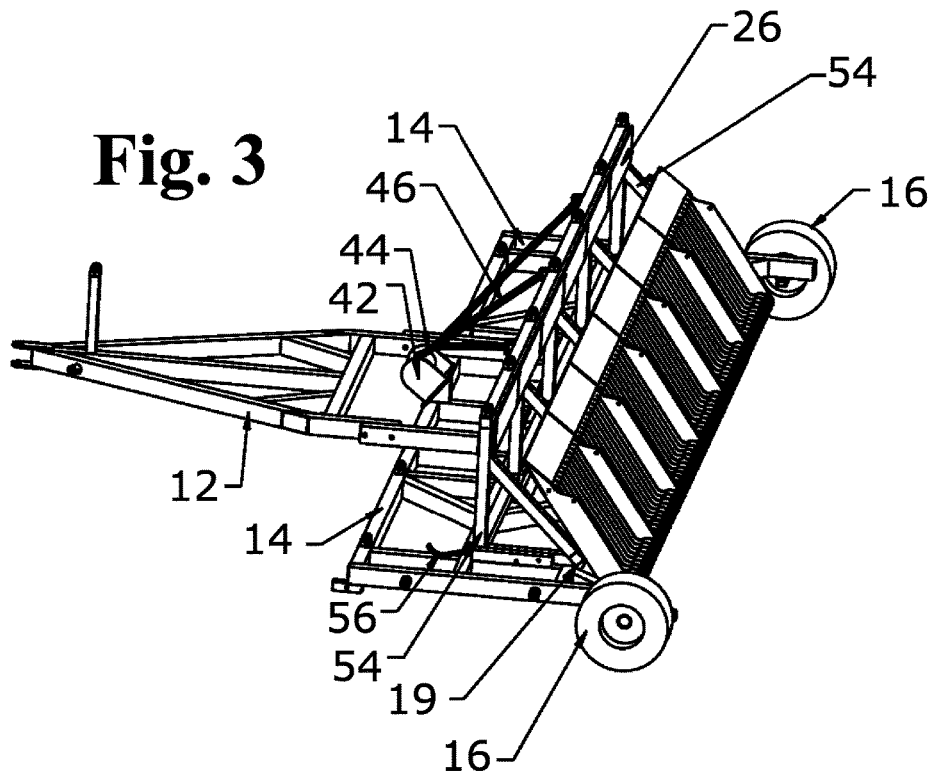
FIG. 3 is a perspective view of the rock collection machine of FIG. 1 in rock disposal position.

Each towing mechanism 35 has a length selected such that, in operation, the nose 36 of the rock collector 32 is spaced rearward from the rock lifter 24 for reasons explained in more detail hereafter. The frame 18 may in an embodiment be hinged to the trailer 14 by hinges 19 to rotate forward to a travelling position shown in FIG. 3 and lift the rock lifter 24 and rock collector 32 upward onto the trailer 14. To assist in rotating the frame 18, the trailer 14 includes a winch 42 mounted on a forward part of the trailer 14 and connected by a winch cable 44 and bridle 46 to the frame 18 for rotating the frame 18.

The frame 18 may be triangular in shape with a forward vertex 50, an upper vertex 52 and a rearward vertex 54. The frame 18 is hinged to the trailer 14 at the forward vertex 50 and the rearward vertex 54 is at the rear 22 of the frame 18. The winch cable 44 extends over the upper vertex 52 and connects to the frame 18 at the rear 22 for example to a rail at or near the rearward vertex 54 via the bridle 46.

A push-off spring 56 may be connected to the frame 18 or trailer 14 to bias the frame 18 away from the trailer 14 when the frame 18 is in the travelling (raised or rock dumping) position. As shown in FIG. 1, the spring 56 is attached to the frame 18 between the forward vertex 50 and upper vertex 52 by a bracket 57 and upon rotation of the frame 18 upon operation of the winch 42, the spring 56 comes into contact with a front portion of the trailer 14.

The rock lifter 24 may comprise one or more plates 26 that are secured by any suitable means to the rear 22 of the frame 18. The rock lifter plates 26 may be allowed to rotate independently and the plates 26 are conveniently made of solid material but may have perforations or themselves be made of multiple parts or may be a stiff mesh or the like that has sufficient strength to lift rocks onto the collector plate. The plate or plates 26 should be sufficiently rugged to withstand contact with rocks and lift the rocks without bending excessively. The one or more plates 26 may extend across the width of the rock collectors, which would typically correspond to the width of the frame 18 and trailer 14 as shown.

The ground engaging wheels 16 may be secured to the trailer 14 at one of two pairs of wheel mounts 60, 62. One pair or set of wheel mounts 60 may be located at the rear of the trailer 14 defined in relation to the rock collecting orientation A. The other set of wheel mounts 62 are located on one side 64 of the trailer 14 defined in relation to the rock collecting orientation A. There could be wheels connected to both sets of wheel mounts 60, 62, but the ground engaging wheels 16 may be connected to either one of the two pairs of wheel mounts 60, 62. Additional wheels mounts may be provided as desired.

In an embodiment of a rock collecting method, the rock lifter 24 is suspended from the frame 18 for movement in a vertical direction, and the frame 18 along with the trailer 14 is towed across a ground surface with a rock collector 32 behind the rock lifter 24 as shown in FIG. 1. Rocks are collected on the rock collector 32 that are propelled onto the rock collector 32 by the rock lifter 24. Once rocks are collected on the rock collector 32, the rock collector 32 may be lifted by operation of the winch 42 to discharge the rocks at a desired location. Lifting of the rock collector 32 may be accomplished in an embodiment by rotating the frame 18.

There is now provided a more detailed explanation of the operation of the rock collection machine.

Figure 4:
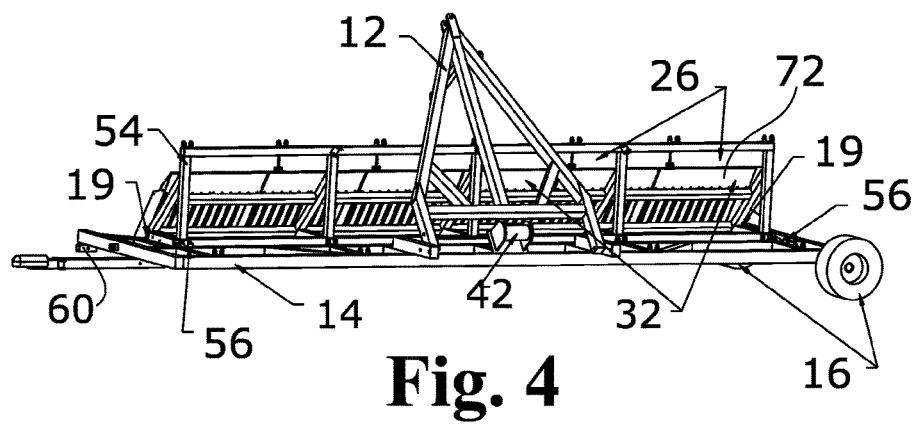
FIG. 4 is a perspective view of the rock collection machine of FIG. 1 in travelling position

The operation of the rock collection machine 10 begins as the tractor vehicle (not shown) is engaged and the rock collector units 34 are pulled forward. Each rock collector unit 34 includes a plate 70 on the top surface of the sharply angled nose 36 and also best includes a plate 72 (FIG. 4) on the bottom side of the nose 36 that allows the individual rock collector unit 34 to skim and not deeply penetrate the soil surface. Rocks will then pass underneath the angled rock lifter plates 26 that are deployed before the rock collector units 34 and either bounce directly onto these units 34 or contact the noses 36 of these units. Depending on various factors such as the shape of the rock or the conditions of the field, a rock will either immediately slide or jump up onto the grated bed 38 of one of the rock collectors 34 and if large enough, be trapped both by the raised sides 39 and tail section 40 of the rock collector 34, or the rock will slide back down the nose 36 of the rock collector unit 34 and fall into the gap 74 formed between the nose 36 of the rock collector unit 34 and one of the rock lifter plates 26. At this point, the rock will begin rolling in this gap 74 as it contracts the ground where it will either bounce up onto the rock collector grates 38 directly, or bounce off of the angled rock lifter plate 26 and onto the rock collector grates 38.

Should a rock rest against a rock lifter plate, 26 it will not remain there long as another rock will soon pass beneath the rock lifter plate 26 and spring the resting rock up onto the rock collector grates 38. Figuratively, the rocks conspire in their own demise as an incoming rock pushes against the rock lifter plate 26 and pushes and lifts the rock resting against this plate up and onto the grates of the rock collector unit 34. It may be considered a one-way-valve leaving few options for the rocks except to be captured by the rock collector units 34. Slightly smaller rocks will pass through the spacings between the grates of the rock collector units 34 while very small rocks will pass beneath the nose of the rock collectors 34.

Once the rock collector units are filled with rocks, or when the operator approaches a previously formed row of rocks that he wishes to align to, he will slow or stop the tractor and activate the rock collector unloading mechanism. In the present embodiment, this mechanism is shown as a triangular shaped frame 18, a rotation frame, that is hinged and able to rotate upwards raising the rock collector units 34 such that the rocks fall out of the back end of the rock collectors 34, and into a row onto the field. The operator then moves the tractor forward and lowers the assembly of rock collector units 34 to continue collecting rocks. In the present embodiment, the method illustrated for raising the rotation frame with attached rock collector units is by way of a hydraulic cable winch 42. A cable 44 running from the winch runs over top of the rotation frame 18, the cable then may be divided into other cable segments 46 as illustrated in order to distribute the cable tension onto other areas of the rotation frame 18.

This embodiment also includes push-off springs 56 that serve to off-centre the lifting frame 18 and raised rock collector units 34 and return these by gravity to the ground position ready for rock collection. In the case of the use of the hydraulic winch 42, the cable 44 is incapable of pushing the lifting frame back down and therefore the push-off springs serve in this capacity. Of course it would be feasible to use other types of lifting power units rather than the hydraulic winch 42, such as an electric winch. However, the hydraulic winch 42 is convenient as typically tractors are already provided with hydraulic outlets and controls. It is as well feasible to use a single or a pair of hydraulic cylinders as part of the rock collector unloading mechanism and in this case, to raise or lower the rotation frame 18 and attached rock collector units 34.

The embodiment as illustrated also shows a field use hitch which is capable of being raised and locked into an upright position when it is desirable to transport the invention along a roadway. In this event, once the rock collector units 34 have been lifted and locked in place, the tractor (not shown) may be unhitched from the trailer frame 18 of the device and the field hitch 12 raised up and locked in place. At this point, the trailer frame 14 may be attached to a road vehicle such as a truck or trailer via an auxiliary trailer hitch provided to the trailer frame 14. At this point, the two wheels of the trailer frame as illustrated may be re-located in separate sockets 62 in the trailer frame such that the trailer frame may be pulled at 90 degrees to the travel direction of the field position hitch. By this, the trailer frame and all associated components may be pulled in the narrow dimension of the trailer frame down a roadway.

The exemplary embodiment of a rock collection machine uses rock collector arrays that skim the surface of the soil interacting mainly with the rocks on the surface with minimal disturbance of the soil sub-surface. As such the power of operation is less than devices such as the rotary rock windrower or the heavier stick rakes that have moving components that till the soil in the action of rowing rocks. As a surface skimmer interacting with surface soil and rocks, the present invention may be operated at roughly twice the speed of the competing devices. As well, there is a fundamental difference in operation of competing windrowing devices and the device of the present invention and that is rock collection. Both the rotary rock windrower and the heavier stick rakes used for rock windrowing make continuous rows of rocks as they progress along the field. Depending of course on the density of rock in the field, these formed windrows of rocks will vary in density of rocks from thin to heavy. Nonetheless, they form continuous windrows that must then be followed with the rock picker to retrieve the rocks. This means typically that the entire field is patterned with evenly spaced rock windrows and of course the rock picker must be pulled as well over the entire field of windrows. This is very time and energy consuming.

The rock collector units 34 of the exemplary embodiment of a rock collection machine collect rocks as they are pulled over the field and then only dumped into windrows when the rock collectors are full producing high density and highly visible rows of rocks. This means that rather than forming long continuous thinly populated rows or rocks, the exemplary embodiment of a rock collection machine forms short high density rows of rocks thereby minimizing the distance the rock picker must be driven to pick up the rocks. The operator of the exemplary embodiment of a rock collection machine may further ease the work of the rock picker machine by lining up the rows of rocks by choosing to form rock windrows in-line with the windrows of the previous pass of the field. These will line up of course perpendicular to the operators direction of travel to form continuous high density rock windrows across the field for easy pick-up by the operator of the rock picker.

As the exemplary embodiment of a rock collection machine skims the soil surface rather than more deeply tilling soil, it may be used in other field types such as hayfields without damage to the perennial forage plants, and not limited to use in only tilled or fallowed fields. In older hayfields where rocks may be partially submerged in the field, the field may be passed over with a disc implement with the discs set at only a small angle off of the direction of travel to lift submerged rocks without undue damage to the field plants. This can be done in advance of the passage of the present invention in order to loosen the rocks for pick-up and collection by this device. As well, the exemplary embodiment of a rock collection machine may be directly attached to the implement used to loosen submerged rocks and so in one pass, both loosen the rocks and form rock windrows for pick-up. This is best done in dry soil conditions to avoid clogging of the rock collectors of the present invention should the disc form larger wet clods of dirt.

Additionally, as an exemplary embodiment of a rock collection machine includes rock collector units 34 that are loosely connect together, as an array, they are able to conform to dips and bumps in fields, especially untilled hayfields, and thereby collect rocks that would otherwise escape other more rigid designs such as the rotary rock windrower.

Again, as an exemplary embodiment of a rock collection machine includes rock collector units that are assembled together as an array or gang, the length of that gang may be increased or decreased according to the requirement of the application. This is not an option for the rotary windrower for which the sweep is limited by the length of the rigid windrowing cylinder and set of spiral auger teeth.

As a side benefit, and by virtue of the design of the surface skimming rock collector units that each incorporate a thin leading edge or nose, these units very effectively cut through bumps and mounds in the surface soil that are produced by frost heaves, gophers and coyotes for example, passing the soil, rocks and debris in these mounds through the separations of the grates in the rock collector units and re-distributing these more evenly on the soil surface as the rock collector assembly progresses along the field.

The embodiments of the invention in which an exclusive property or privilege is claimed are defined as follows:

1. A rock collecting machine, comprising:
    a frame mounted on a trailer, the frame having a front and a rear defined in relation to a rock collecting orientation;
    a rock lifter suspended from the rear of the frame to allow rock lifting movement of the rock lifter when the trailer is moving over a surface;
    a rock collector secured to the frame by a towing mechanism, the rock collector having a nose and the towing mechanism having a length selected such that, in operation, the nose of the rock collector is spaced rearward from the rock lifter;
    the rock lifter extending substantially across the width of the rock collector and comprising plates that are mounted for rotation relative to the frame, the plates having upper surfaces and lower surfaces; and
    the plates of the rock lifter being movable vertically on impact from rocks on the lower surfaces of the plates of the rock lifter to allow incoming rocks to pass under the rock lifter and to propel other rocks resting against the upper surfaces of plates of the rock lifter into the rock collector.

2. The rock collecting machine of claim 1 in which the frame is hinged to the trailer to rotate forward to a travelling position and lift the rock lifter and rock collector upward onto the trailer for unloading and transit.

3. The rock collecting machine of claim 2 further comprising a winch mounted on a forward part of the trailer and connected by a winch cable to the frame for rotating the frame.

4. The rock collecting machine of claim 3 in which the frame is triangular in shape with a forward vertex, an upper vertex and a rearward vertex, the frame is hinged to the trailer at the forward vertex and the rearward vertex is at the rear of the frame.

5. The rock collecting machine of claim 4 in which the winch cable extends over the upper vertex and connects to the rear of the frame.

6. The rock collecting machine of claim 2 further comprising a push-off spring connected to the frame or trailer to bias the frame away from the trailer when the frame is in the raised or travelling position.

7. The rock collecting machine of claim 1 in which the rock lifter is suspended from the rear of the frame by chain links.

8. The rock collecting machine of claim 1 further comprising ground engaging wheels and at least two pairs of wheel mounts, one set of wheel mounts being at the rear of the trailer defined in relation to a rock collecting orientation, and one set of wheel mounts being on one side of the trailer defined in relation to a rock collecting orientation, the ground engaging wheels being connected to one of the at least two pairs of wheel mounts.

9. The rock collecting machine of claim 1 in which the rock lifting movement comprises a vertical component of movement and a rearward component of movement.

10. A method for collecting rocks, comprising:
    suspending a rock lifter from a frame for movement in a vertical and rearward direction in relation to forward movement of the frame, the rock lifter being movable vertically on impact from a rock on the rock lifter;
    the rock lifter comprising plates mounted for rotation relative to the frame, the plates having upper surfaces and lower surfaces;
    towing the frame across a ground surface with a rock collector behind the rock lifter; and
    collecting rocks on the rock collector that are propelled onto the rock collector by the rock lifter;
    in which incoming rocks pass under the rock lifter and impact the lower surfaces of the plates of the rock lifter to move the plates of the rock lifter vertically on impact to propel other rocks resting against the upper surfaces of the plates of the rock lifter into the rock collector.

11. The method of claim 10 further comprising, after collecting rocks on the rock collector, lifting the rock collector to discharge the rocks.

12. The method of claim 11 in which lifting the rock collector comprises rotating the frame.

* * * * *